(12) United States Patent
Sampath et al.

(10) Patent No.: US 8,218,426 B2
(45) Date of Patent: Jul. 10, 2012

(54) MULTIPLE STAGE FOURIER TRANSFORM APPARATUS, PROCESSES, AND ARTICLES OF MANUFACTURE

(75) Inventors: Hemanth Sampath, San Diego, CA (US); Kaushik Ghosh, San Diego, CA (US); Raghu N. Challa, San Diego, CA (US); Sameer Vermani, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 372 days.

(21) Appl. No.: 12/408,363

(22) Filed: Mar. 20, 2009

(65) Prior Publication Data

US 2009/0268603 A1 Oct. 29, 2009

Related U.S. Application Data

(60) Provisional application No. 61/040,324, filed on Mar. 28, 2008.

(51) Int. Cl.
*H04J 11/00* (2006.01)
(52) U.S. Cl. ....................................................... 370/210
(58) Field of Classification Search .................... 370/210
See application file for complete search history.

(56) References Cited

U.S. PATENT DOCUMENTS

| | | | |
|---|---|---|---|
| 7,197,525 B2 * | 3/2007 | Stein et al. | 708/409 |
| 7,398,458 B2 * | 7/2008 | Ferguson | 714/796 |
| 7,660,840 B2 * | 2/2010 | Taunton | 708/409 |
| 2004/0059766 A1 * | 3/2004 | Yeh | 708/406 |
| 2004/0111227 A1 | 6/2004 | Stein et al. | |
| 2005/0071403 A1 | 3/2005 | Taunton | |
| 2007/0162533 A1 * | 7/2007 | Wada | 708/404 |
| 2007/0223604 A1 * | 9/2007 | Miyano et al. | 375/260 |
| 2007/0239815 A1 * | 10/2007 | Cousineau et al. | 708/404 |
| 2009/0268603 A1 * | 10/2009 | Sampath et al. | 370/210 |

OTHER PUBLICATIONS

International Search Report and Written Opinion—International Searching Authority; PCT/US2009/038000; Aug. 20, 2009.

* cited by examiner

*Primary Examiner* — Ricky Ngo
*Assistant Examiner* — Ben H Liu
(74) *Attorney, Agent, or Firm* — Larry Moskowitz; Abdollah Kaibab

(57) ABSTRACT

In embodiments, a fast Fourier transform (FFT) engine includes a series of stages, each stage containing a butterfly and a data normalization device configured to scale output of the stage's butterfly. The scaling factors are adjusted, for example, periodically or on as-needed basis, so that the dynamic range of the butterflies and the buffers is increased for a given bit-width, or the bit-width of these devices is decreased for the same dynamic range. Additionally, bit-width of other buffer(s) is decreased because of the scaling of the data.

32 Claims, 9 Drawing Sheets

MULTIPLE STAGE FOURIER TRANSFORM APPARATUS, PROCESSES, AND ARTICLES OF MANUFACTURE

CLAIM OF PRIORITY UNDER 35 U.S.C. §119

The present application for patent claims priority to Provisional Application No. 61/040,324, entitled "METHODS AND APPARATUS FOR ACCOMMODATING A LARGE FREQUENCY DOMAIN DYNAMIC RANGE OF A RECEIVED OFDM SIGNAL," filed on Mar. 28, 2008, and assigned to the assignee hereof and hereby expressly incorporated by reference herein.

BACKGROUND

1. Field

The present invention relates generally to communications. More particularly, in aspects the invention relates to operation of fast Fourier transform engines.

2. Background

Modern wireless communication systems are widely deployed to provide various types of communication applications, such as voice and data applications. These systems may be multiple access systems capable of supporting communication with multiple users by sharing the available system resources (e.g., spectrum and transmit power). Examples of multiple access systems include code division multiple access (CDMA) systems, time division multiple access (TDMA) systems, frequency division multiple access (FDMA) systems, time division duplexing (TDD) systems, frequency division duplexing (FDD) systems, $3^{rd}$ generation partnership project long term evolution (3GPP LTE) systems, and orthogonal frequency division multiple access (OFDMA) systems. There are also point-to-point systems, peer-to-peer systems, and wireless local area networks (wireless LANs).

Generally, a wireless multiple access communication system can simultaneously support communications with multiple wireless terminals. Each terminal communicates with one or more base transceiver stations (BTSs or base stations) via transmissions on forward and reverse links. The forward link or downlink refers to the communication link from a base transceiver station to a terminal, and the reverse link or uplink refers to the communication link from a terminal to a base transceiver station. Each of the forward and reverse communication links may be established via a single-in-single-out, multiple-in-single-out, single-in-multiple-out, or a multiple-in-multiple-out (MIMO) communication technique, depending on the number of transmitting and receiving antennae used for the particular link.

MIMO systems are of particular interest because of their relatively higher data rates, relatively longer coverage range, and relatively more reliable transmission of data. A MIMO system employs multiple ($N_T$) transmit antennae and multiple ($N_R$) receive antennae for data communication. A MIMO channel formed by the $N_T$ transmit and $N_R$ receive antennae may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g. higher throughput and/or greater reliability) if the additional dimensions created by the multiple transmit and receive antennae are used.

Communication systems often perform at least some processing of the received signals in the frequency domain. The received signals are typically transformed from time domain to the frequency domain using Fourier transforms. Conversely, inverse Fourier transforms can be used to transform frequency domain signals to the signals' time domain counterparts. Additionally, communication systems, such as those implementing Orthogonal Frequency Division Multiplexing (OFDM), can use certain properties of Fourier transforms to generate multiple time domain symbols from linearly spaced tones and to recover the frequencies from the symbols.

Fast Fourier Transform (FFT) is a computational algorithm implementing the Fourier transform. The FFT allows the Fourier transform to be performed in fewer computational operations than used for discrete Fourier transform (DFT). Often, the module responsible for the FFT (the "FFT engine") in a wireless device is implemented as a sequence of "butterflies." A "butterfly" in this context is a computational portion of the FFT engine that implements a small (relative to the entire FFT engine) DFT. The term "butterfly" typically appears in description of the Cooley-Tukey FFT algorithm. The Cooley-Turkey algorithm breaks down a DFT of composite size n=(r·m) into r smaller transforms of size m, where r is the so-called "radix" of the FFT transform. The breakdown is performed recursively, and the smaller transforms are combined with size-r butterflies, which themselves are DFTs of size r (performed m times on the outputs of the smaller transforms) pre-multiplied by roots of unity. The steps can also be performed in reverse, so that the butterflies come first and are post-multiplied by the roots of unity.

The output of the FFT engine is usually stored on a processing chip in an output buffer or Random Access Memory (RAM), for further processing in the frequency domain. The size of the output buffer can be quite large, and occupy a significant percentage of the application-specific integrated circuit (ASIC), increasing die-area and cost. For example, a wireless standard may define a Packet or Frame to have eight OFDM symbols, each with 1024 tones. In such a case, the mobile device with four receive antennae may have to instantiate an output buffer that needs to store eight OFDM symbols times 1024 tones times four receive antennas times 16 bit I/Q samples, resulting in a one Mbit buffer. With double-buffering of output Frames, the size increases to two Mbits.

The input time domain signal may fluctuate significantly. For example, every OFDM symbol can have a different power level and different spectral characteristics. This is because of the power control, adaptive or otherwise, and the varying nature of the physical channel, which is subject to noise, multipath and fading, attenuation, Doppler shift, and interference. The significant fluctuations of the signal amplitude at the FFT output—i.e., increased dynamic range—necessitate additional increases in the memory used for buffering the output of the FFT engine of a wireless device.

Because memory is a scarce resource—with weight, size, and power consumption costs in addition to the direct economic cost—a need exists in the art for apparatus, methods, and articles of manufacture that reduce the buffer size requirement at the output of the FFT engine. Another need exists in the art to reduce FFT engine output buffer requirement without compromising other performance characteristics, including dynamic range. Yet another need exists to reduce the computational resources used by the butterflies in the FFT engine.

SUMMARY

Embodiments disclosed herein may address one or more of the above stated needs by providing apparatus, methods, and articles of manufacture for performing fast Fourier transform in an FFT engine configured to scale intermediate results between the butterflies, thereby allowing bit-width reduction of the butterflies and buffers.

In an embodiment, a wireless communication method includes transforming a block of received signal data in a plurality of stages arranged in series so that the block of received signal data is inputted into a first stage of the plurality of stages, processed successively through each stage of the plurality of stages, and a fast Fourier transformed block of signal data is outputted from a last stage of the plurality of stages. Each stage of the plurality of stages includes a butterfly and a data normalization device. The data normalization device of each stage scales output of the butterfly of each stage by a normalization factor corresponding to the data normalization device of each stage. The method also includes processing the fast Fourier transformed block to obtained a processed block of data. The method further includes using the processed block in an application of a wireless device, for example, rendering information contained in the processed block.

In an embodiment, a device includes a fast Fourier transform (FFT) block with an input, an output, and a plurality of stages arranged in series so that the FFT block is configured to process a block of received signal data inputted into a first stage of the plurality of stages successively through each stage of the plurality of stages to obtain a fast Fourier transformed block of signal data, and to output the fast Fourier transformed block from the output of the FFT block. Each stage of the plurality of stages has a butterfly and a data normalization device. The data normalization device of each stage scales output of the butterfly of the stage by a normalization factor corresponding to the data normalization device of the stage. The device also includes a processing block configured to process the fast Fourier transformed block to obtain a processed block of data. The device further includes an application block configured to operate on the processed block of data, for example, to render information included in the processed block of data.

In an embodiment, a wireless device includes at least one receiver, at least one transmitter, and at least one controller coupled to the at least one receiver and the at least one transmitter. The at least one controller is configured to perform a number of steps. The steps include transforming a block of received signal data in a plurality of stages arranged in series so that the block of received signal data is inputted into a first stage of the plurality of stages, processed successively through each stage of the plurality of stages, and a fast Fourier transformed block of signal data is outputted from a last stage of the plurality of stages. Each stage of the plurality of stages has a butterfly and a data normalization device. The data normalization device of each stage scales output of the butterfly of the stage by a normalization factor corresponding to the data normalization device of the stage. The steps also include processing the fast Fourier transformed block to obtain a processed block of data. The steps further include using the processed block in an application of the wireless device, for example, rendering information contained in the processed block of data.

In an embodiment, a computer program product stores, on computer-readable medium, code for causing a computer to communicate wirelessly. The code includes instructions for transforming a block of received signal data in a plurality of stages arranged in series so that the block of received signal data is inputted into a first stage of the plurality of stages, processed successively through each stage of the plurality of stages, and a fast Fourier transformed block of signal data is outputted from a last stage of the plurality of stages. Each stage of the plurality of stages has a butterfly and a data normalization device. The data normalization device of each stage scales output of the butterfly of the stage by a normalization factor corresponding to the data normalization device of the stage. The code also includes instructions for processing the fast Fourier transformed block to obtain a processed block of data. The code further includes instructions for using the processed block in an application of a wireless device, for example, rendering information contained in the processed block of data.

In an embodiment, a device includes a means for performing a fast Fourier transform on a block of received signal data to obtain a fast Fourier transformed block of signal data, a means for normalizing signals in the means for performing, a means for processing the fast Fourier transformed block to obtain a processed block of data, and a means for rendering information contained in the processed block of data.

These and other aspects of the present invention will be better understood with reference to the following description, drawings, and appended claims.

DETAILED DESCRIPTION

Figure 1:
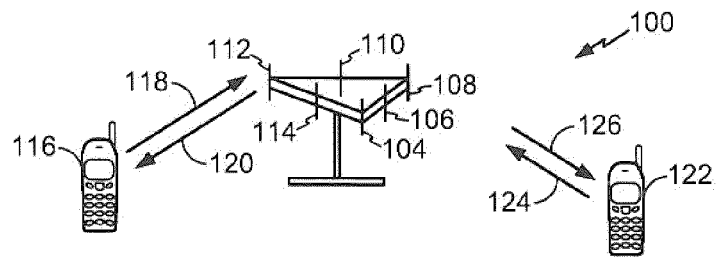
FIG. 1 illustrates selected elements of a multiple access wireless communication system which may be configured in accordance with embodiments described in this document.

In this document, the words "embodiment," "variant," and similar expressions are used to refer to a particular apparatus, process, or article of manufacture, and not necessarily to the same apparatus, process, or article of manufacture. Thus, "one embodiment" (or a similar expression) used in one place or context may refer to a particular apparatus, process, or article of manufacture; the same or a similar expression in a different place may refer to a different apparatus, process, or article of manufacture. The expressions "alternative embodiment," "alternative variant," "alternatively," and similar phrases may be used to indicate one of a number of different possible embodiments or variants. The number of possible embodiments or variants is not necessarily limited to two or any other quantity.

The word "exemplary" may be used herein to mean "serving as an example, instance, or illustration." Any embodiment or variant described herein as "exemplary" is not necessarily to be construed as preferred or advantageous over other embodiments or variants. All of the embodiments and variants described in this description are exemplary embodiments and variants provided to enable persons skilled in the art to make and use the invention, and not necessarily to limit the scope of legal protection afforded the invention.

"Tone" and "sub-carrier" are generally used interchangeably to indicate individual symbol-carrying tones in an OFDM or OFDMA system.

"Gain control device" and "data normalization device" are used interchangeably. Such devices are described in the context of fast Fourier transform engines.

The techniques described in this document may be used for various wireless communication networks, including CDMA networks, TDMA networks, FDMA networks, OFDM and OFDMA networks, Single-Carrier FDMA (SC-FDMA) networks, and other networks and peer-to-peer systems. The techniques may be used on both forward and reverse links. Further, the techniques are not necessarily limited to wireless or other communication systems, but may be used in any apparatus where signals are processed in a fast Fourier transform engine. The terms "networks" and "systems" are often used interchangeably. A CDMA network may implement a radio technology such as Universal Terrestrial Radio Access (UTRA), cdma2000, and other technologies. UTRA networks include Wideband-CDMA (W-CDMA) and Low Chip Rate (LCR) networks. The cdma2000 designates IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, and other technologies. UTRA, E-UTRA, and GSM are parts of Universal Mobile Telecommunication System (UMTS). Long Term Evolution (LTE) is a release of UMTS that uses E-UTRA. UTRA, E-UTRA, GSM, UMTS and LTE are described in documents from an organization known as the "3rd Generation Partnership Project" (3GPP). The cdma2000 standard is described in documents from an organization known as the "3rd Generation Partnership Project 2" (3GPP2). Certain aspects of the techniques are described in the context of LTE systems, and LTE terminology may be used in the description below, but the techniques may be applicable to other standards and technologies.

Single carrier frequency division multiple access (SC-FDMA) is a communication technique which utilizes single carrier modulation and frequency domain equalization. SC-FDMA systems typically have similar performance and essentially the same overall complexity as OFDMA system. SC-FDMA signals have lower peak-to-average power ratio (PAPR) because of the technique's inherent single carrier structure. The SC-FDMA technique is attractive in many systems, especially in the reverse link communications where the lower PAPR benefits the mobile terminal in terms of transmit power efficiency. The SC-FDMA technique is currently a working assumption for the uplink multiple access scheme in 3GPP Long Term Evolution and Evolved UTRA.

A multiple access wireless communication system 100 according to one embodiment is illustrated in FIG. 1. An access point or a base transceiver station 101 includes multiple antenna groups, one group including antennae 104 and 106, another group including antennae 108 and 110, and an additional group including antennae 112 and 114. Although only two antennae are shown for each antenna group, more or fewer antennae may be included in any of the antenna groups. The BTS 101 may also include a single antenna group, or have only a single antenna. An access terminal (AT) 116 is in communication with the antennae 112 and 114, where antennae 112 and 114 transmit information to the access terminal 116 over a forward link 120, and receive information from the access terminal 116 over a reverse link 118. Another access terminal 122 is in communication with antennae 106 and 108, where the antennae 106 and 108 transmit information to the access terminal 122 over a forward link 126 and receive information from the access terminal 122 over a reverse link 124. In an FDD system, each of the communication links 118, 120, 124 and 126 may use a different frequency for communications between access terminals and a particular antenna or antenna group, as well as different frequencies for forward and reverse links. For example, the forward link 120 may use a different frequency then that used by the reverse link 118, and still another frequency than that used by the forward link 126. The use of different frequencies, however, is not necessarily a requirement of the invention.

Each group of antennae and the area in which it is designed to communicate is often referred to as a sector. As shown in FIG. 1, each of the antenna groups is designed to communicate to access terminals in a different sector of the area covered by the BTS 101.

In communications over the forward links 120 and 126, the transmitting antennae of the BTS 101 use beamforming in order to improve the signal-to-noise ratio of the forward links for the different access terminals 116 and 122. Additionally, beamforming reduces interference for access terminals in neighboring cells, as compared to forward link transmissions through a single antenna to all its access terminals. Beamforming is also not necessarily a requirement of the invention.

An access point or a base transceiver station may be a fixed station used for communicating with the terminals and may also be referred to as a Node B or by some other term. An access terminal may also be called a mobile unit, user equipment (UE), a wireless communication device, terminal, mobile terminal, or some other term.

Figure 2:
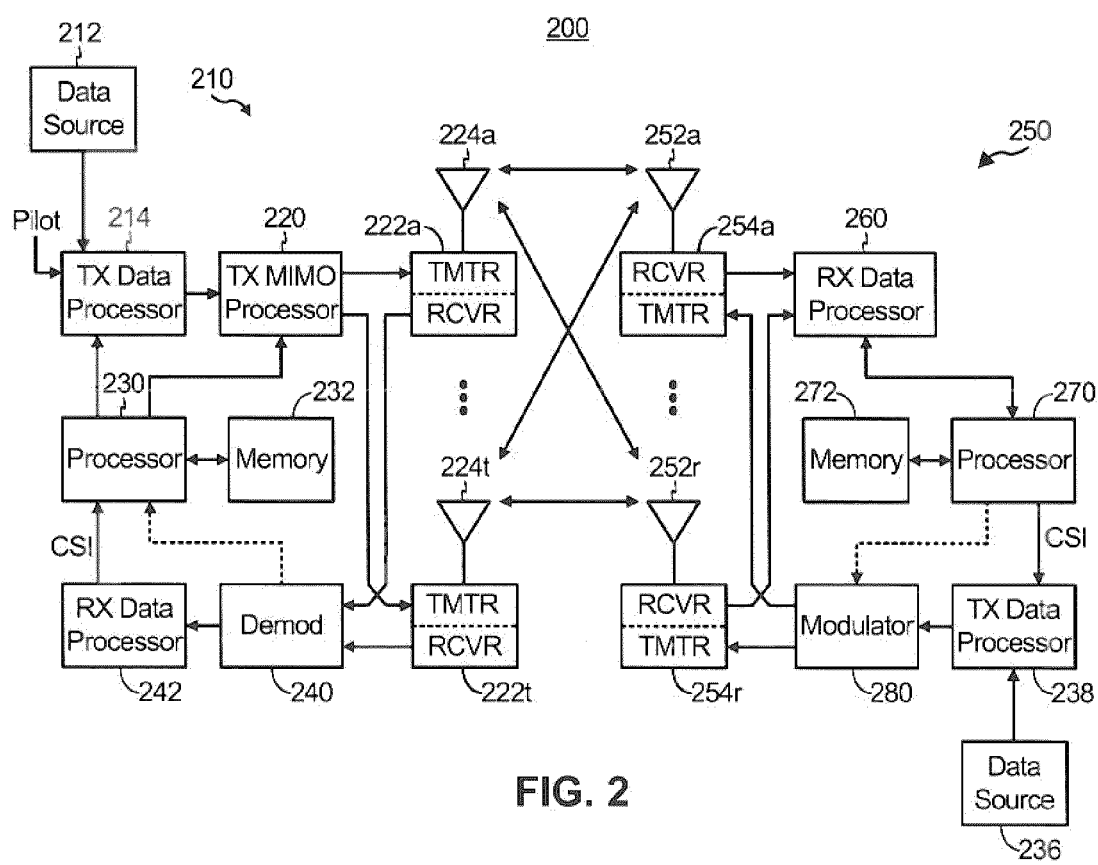
FIG. 2 illustrates in block diagram manner selected components of a wireless MIMO communication system that may be configured in accordance with embodiments described in this document.

FIG. 2 shows, in a block diagram form, selected components of an embodiment of a wireless MIMO communication system 200 that includes a transmitter system 210 of a base transceiver station and a receiver system 250 of an access terminal.

At the transmitter system 210, traffic data for a number of data streams is provided by a data source 212 to a transmit (Tx) data processor 214. In an embodiment, each data stream is transmitted over a respective transmit antenna or antenna group.

The Tx data processor 214 formats, codes, and interleaves the traffic data for each data stream based on a particular coding scheme selected for that data stream to provide coded data. The coded data for each data stream may be multiplexed with pilot data using OFDM techniques. The pilot data is a known data pattern that is processed in a known manner and may be used at the receiver system to estimate the physical channel response or transfer function. The multiplexed pilot and coded data for each data stream are then modulated (i.e., symbol mapped) based on a particular modulation scheme selected for that data stream, to obtain modulation symbols. The modulation scheme may be selected, for example, from binary phase-shift keying (BPSK), quadrature phase-shift keying (QPSK), M-ary Phase-Shift Keying (M-PSK), and multilevel quadrature amplitude modulation (M-QAM). The data rate, coding, and modulation for each data stream may be determined by instructions performed by a processor 230.

The modulation symbols for all data streams are provided to a Tx MIMO processor 220, which may further process the modulation symbols (e.g., for OFDM). The Tx MIMO processor 220 then provides $N_T$ modulation symbol streams to $N_T$ transmitters (TMTRs) 222a through 222t. In certain embodiments, the Tx MIMO processor 220 applies beamforming weights to the symbols of the data streams and to the antennae from which the symbols are transmitted.

Each transmitter 222 receives and processes a respective symbol stream to provide one or more analog signals, and further conditions (e.g. amplifies, filters, upconverts) the analog signals to provide a modulated signal suitable for transmission over its corresponding MIMO channel. The $N_T$ modulated signals from the transmitters 222a through 222t are transmitted from the $N_T$ antennae 224a through 224t, respectively. The antennae 224 may be the same as or different from the antennae 104-114 shown in FIG. 1.

At the receiver system 250, the transmitted modulated signals are received by $N_R$ antennae 252a through 252r, and the received signal from each antenna 252 is provided to a respective receiver (RCVR) 254a through 254r. Each of the receivers 254 conditions (e.g., filters, amplifies, downconverts) its respective received signal, digitizes the conditioned signal to provide samples, and further processes the samples to provide a corresponding received symbol stream.

A receive (Rx) data processor 260 receives and processes the $N_R$ received symbol streams from the $N_R$ receivers 254, based on a particular receiver processing technique, to provide $N_T$ detected symbol streams. The Rx data processor 260 then demodulates, deinterleaves, and decodes each detected symbol stream to recover the traffic data of the data stream. The processing by the Rx data processor 260 is complementary to that performed by the Tx MIMO processor 220 and the Tx data processor 214 at the transmitter system 210.

A processor 270 periodically determines which pre-coding matrix to use. The processor 270 formulates a reverse link message comprising a matrix index portion and a rank value portion. The reverse link message may include miscellaneous information regarding the communication link and/or the received data stream.

The reverse link message is then processed by a Tx data processor 238, which also receives traffic data for a number of data streams from a data source 236. The traffic data and the reverse link message are modulated by a modulator 280, conditioned by transmitters 254a through 254r, and transmitted to the transmitter system 210.

At the transmitter system 210, the modulated signals from the receiver system 250 are received by the antennae 224, conditioned by receivers 222, demodulated by a demodulator 240, and processed by an Rx data processor 242 to extract the reverse link messages transmitted by the receiver system 250. The processor 230 determines which pre-coding matrix to use for determining the beamforming weights, and processes the extracted message.

Figure 3:
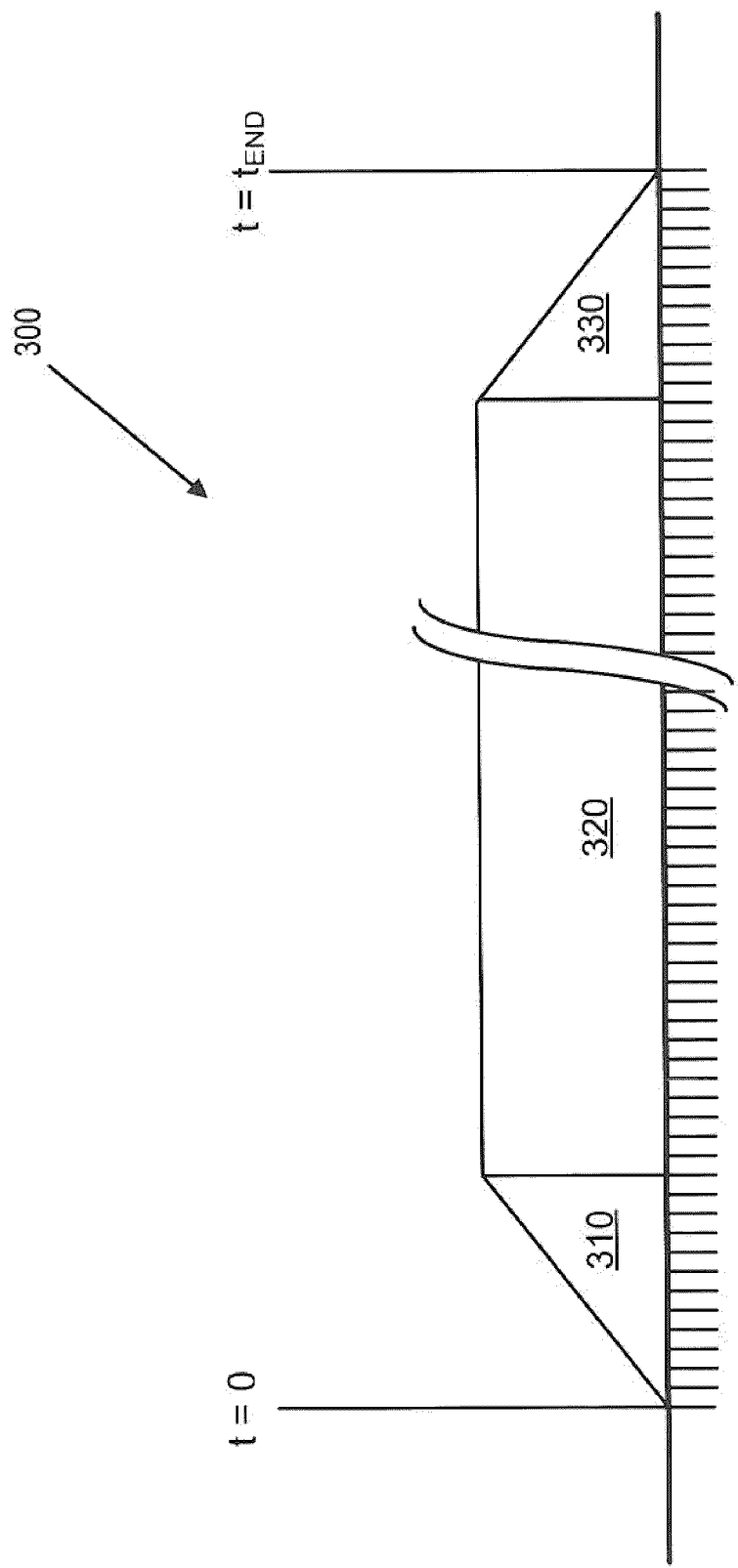
FIG. 3 illustrates selected features of a symbol generated in or received by a terminal.

FIG. 3 illustrates selected features of an OFDM symbol 300 of data transmitted according to selected aspects of this disclosure. The symbol 300 begins at a time t=0 and ends at a time $t_{END}$. The symbol includes a leading ramp portion 310, a data portion 320 (which may include payload or traffic data and certain overhead, such as a cyclic prefix), and a trailing ramp portion 330. The leading and trailing portions are generally present to smooth transitions from symbol to symbol and prevent spikes in transmitted power and the associated spectral spread of the transmitted signal. FIG. 3 is merely an illustration of data according to the present disclosure, and other methods of transmission may be used. For example, the use of OFDM symbols each having a plurality of sub-carriers is not necessarily a requirement of the invention.

Figure 4:
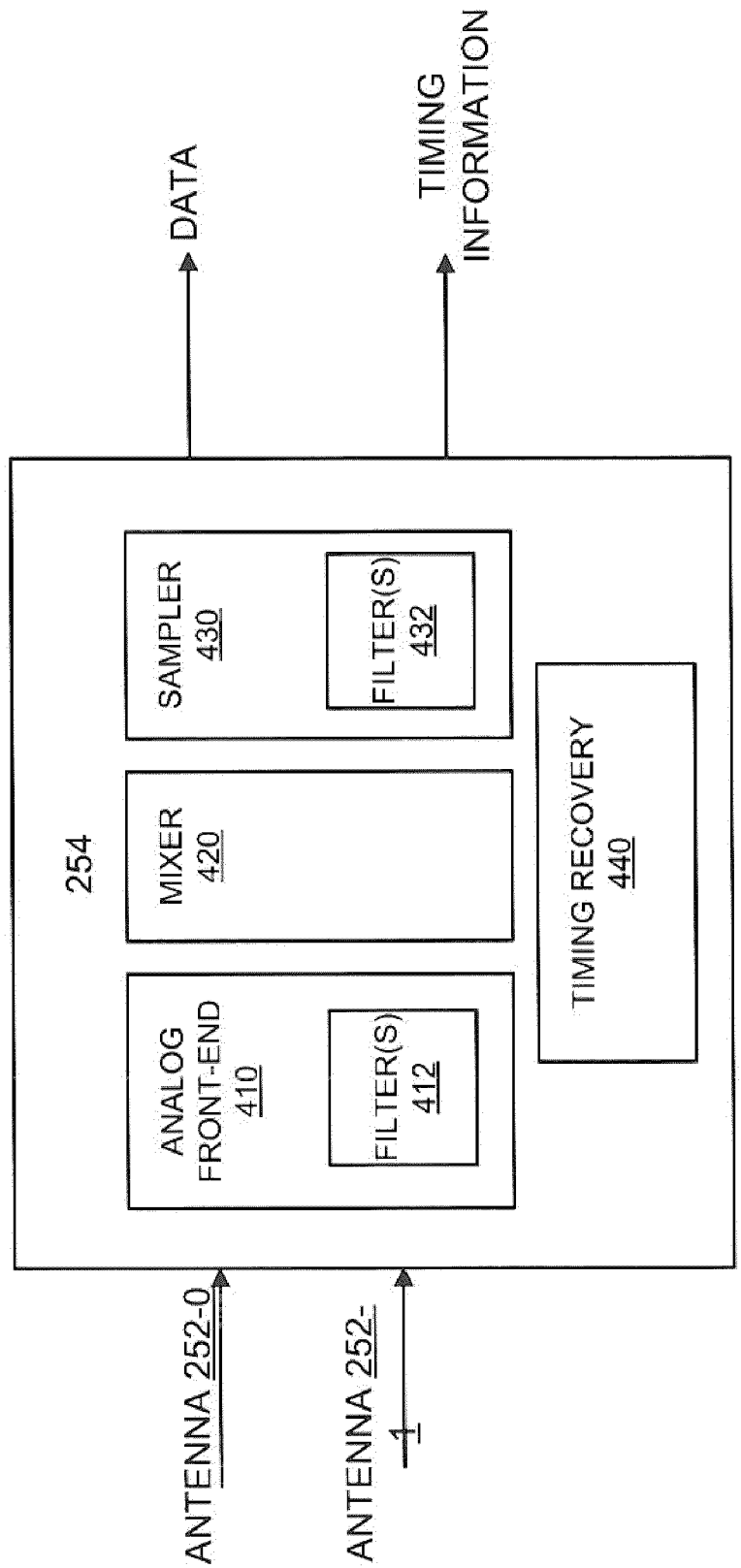
FIG. 4 illustrates selected components of a receiver of the terminal shown in FIG. 2.

FIG. 4 illustrates selected details of a receiver 254 (which is one of the receivers 254a-254r shown in FIG. 2). The receiver 254 receives signals from its associated antenna or antennae 252. Thus, the receiver 254a receives signals from an antenna (or antennae) 252a, while the receiver 254r receives signals from an antenna (or antennae) 252r. The illustration of FIG. 4 and the associated description may apply to any and each of the receivers 254, for example, to the receiver 254a and to the receiver 254r. While some details of the architecture of the receiver 254 are not shown, it should be appreciated that many known and possibly later-developed architectures may be used. In various exemplary embodiments, the modules 410-440 can take the form of separate electronic components coupled together via a series of separate busses. In other embodiments, one or more of the various modules 410-440 can take form of processors or separate servers coupled together via one or more networks. Additionally, it should be appreciated that each of the modules 410-440 advantageously can be realized using multiple computing devices employed in a cooperative fashion. It also should be appreciated that some of the modules 410-440 can take the form of software/firmware structures and routines residing in a memory to be executed or worked upon by a controller, or software/firmware routines or structures residing in separate memories in separate servers/computers being operated upon by different controllers.

In operation, as signals are received by antenna 252-0 and/or antenna 252-1 (and/or any other antenna 252 associated with the receiver 254 shown in FIG. 4), the analog front-end 410 is configured to accept the received signals, condition the signals, and provide the conditioned signals to a mixer 420. Front-end signal conditioning may include filtering the signals through one or more filters 412 in the front-end 410.

The mixer 420 is configured to downconvert the conditioned signals from their received frequency spectrum to a lower baseband spectrum. The converted baseband signals are then provided to a sampler 430, which is configured to convert the analog baseband signals into digital data. One or more filters 432 may be used to filter the baseband signal further, either before or after sampling. Thus, the filter(s) 432 may be analog and/or digital, depending on whether they operate before or after sampling conversion.

While ideal filters may introduce no phase delay, have a flat profile across all received frequencies, and may exhibit a perfect cutoff at any frequency, known realizable filters deviate from such "ideal" filter performance. The filters 412 and 432 may thus introduce distortion to the received signals. For example, one or both of the filters or filter sets 412 and 432 may introduce to the received signal frequency-dependent amplitude and/or phase distortions, such as pass-band amplitude and/or phase ripple.

A timing recovery device 440 is configured to apply various algorithms to the received data to derive timing information from the signals. The timing recovery device 440 may operate independently from other such devices 440 in other receivers 254, or it may operate in conjunction with other timing recovery devices. In variants, the timing recovery device 440 receives analog data from the analog front end 410 or the mixer 420, or it receives digital data from the sampler 430, or both, for use with its algorithms. Because timing recovery may not always be perfect, there may be an inadvertent time offsets τd present, which timing recovery device 440 may eventually recognize and report.

Figure 5:
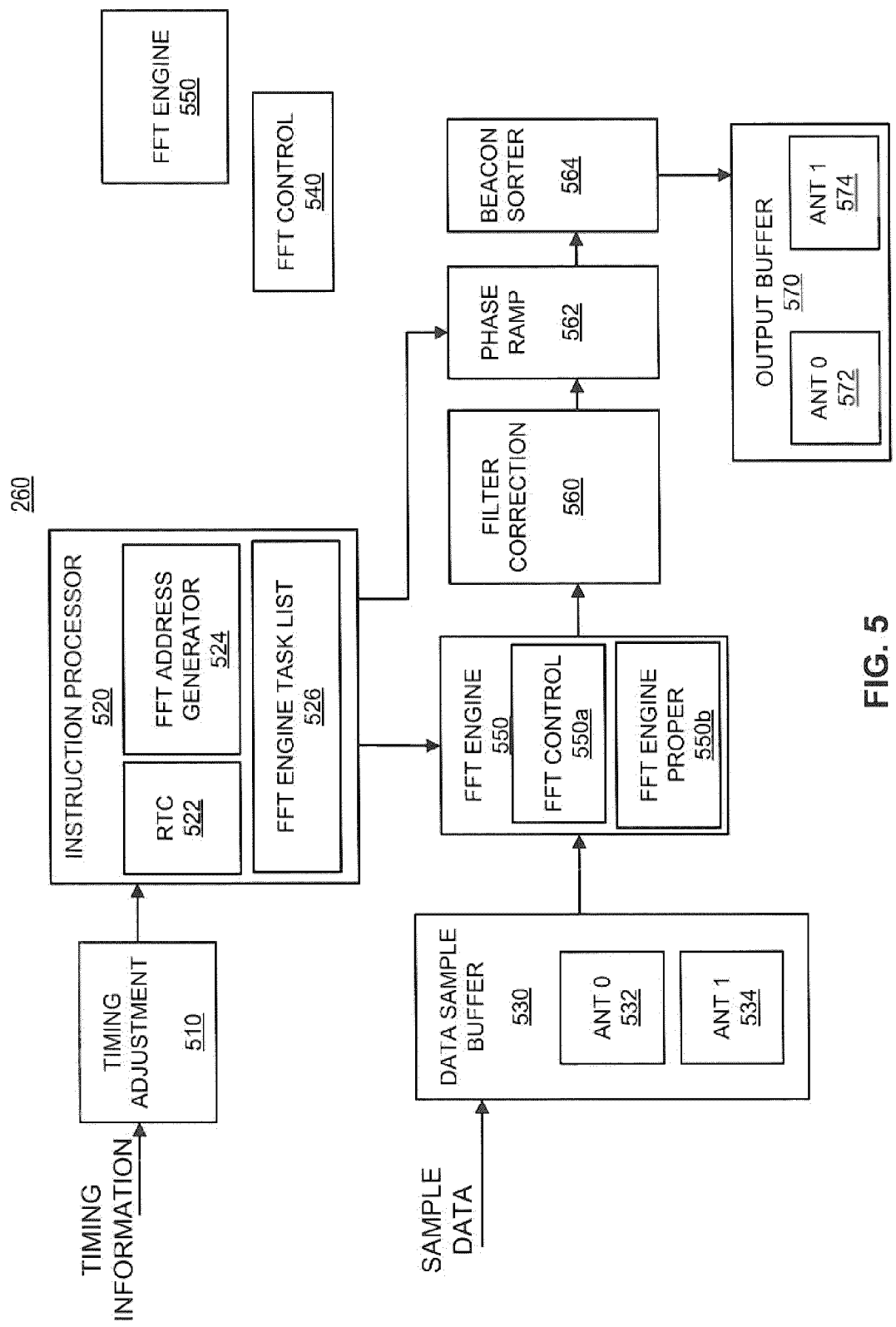
FIG. 5 illustrates selected components of a receive data processor of the terminal of FIG. 2.

FIG. 5 illustrates selected details of the Rx data processor 260 (from FIG. 2), which here is configured to receive both timing information and sample data from the receivers 254. While some details of the architecture of the exemplary Rx data processor 260 are not shown, it should be appreciated that any known or possibly later-developed architectures may be used. In exemplary embodiments, the various modules 510-574 can take the form of separate electronic components coupled together via a series of separate busses. In other embodiments, one or more of the various modules 510-574 can take form of processors or separate servers coupled together via one or more networks. Additionally, it should be appreciated that each of the modules 510-574 advantageously can be realized using multiple computing devices employed in a cooperative fashion. It also should be appreciated that some of the modules 510-574 can take the form of software/firmware structures and routines residing in a memory to be executed or worked upon by a controller, or software/firmware routines or structures residing in separate memories in separate servers/computers being operated upon by different controllers.

The exemplary data processor 260 includes a timing adjustment block 510; an instruction processor block 520, which may be a sequential instruction machine such as a DSP or another processor controller; an input data sample buffer 530; a Fast Fourier Transform (FFT) engine 550 that includes an FFT control device 550a and an FFT engine proper 550b; a filter correction device 560; a phase ramp 562; a beacon sorter 564; and an output buffer 570. The instruction processor block 520 includes a real-time clock or counter (RTC) 522, an FFT address generator 524, and an FFT Engine Task List memory 526. The data sample buffer 530 includes separate blocks 532 and 534 for data associated with different antennae. The output buffer 570 similarly includes separate blocks 572 and 574 for output data associated with the different antennae.

In operation, the timing adjustment block 510 is configured to receive the timing information, and to provide an output time offset τd to the instruction processor block 520. The time offset τd can further be passed on to the phase ramp 562.

The input data sample buffer 530 is configured to receive sample data via one or more antennae 252 of the respective receiver 254, possibly through the front end 410, and to provide buffered data samples to the FFT engine 550.

The FFT address generator 524 of the processor block 520 is configured to generate addresses for use by the FFT engine 550. The control block 550a of the FFT engine 550 receives the addresses generated by the FFT address generator 524 and the commands and variables stored in the FFT Engine Task List 526, and based on this received information controls the FFT engine proper 550a, so that the FFT engine 550 converts the buffered data samples from which communication channels may be resolved.

In the hardware/software/firmware architecture described above, the FFT Engine Task List 526 may store various instructions, various variables, and/or operational data for use by the FFT control block 550a. As non-limiting examples, the FFT Engine Task List 526 may store variable(s) representing a sample start address for a transformation; instructions for reading or supplying the sample start address; variable(s) representing the number of data symbols to skip before or between executions of the Fourier transform; instructions for skipping a number of data symbols before or between executions; variable(s) representing FFT Length; variable(s) representing the number of FFT stages or butterflies to be executed; instructions for executing multiple FFT stages; variable(s) representing scaling or gain control for each FFT stage to be executed (as will be discussed in more detail below); instructions for executing scaling at or following each FFT stage/butterfly; variable(s) representing a start time for each FFT operation to be executed; instructions for starting an FFT operation; variable(s) indicating a bit for instant start; and/or instructions for performing an instant start. These are merely examples, and other instructions, variables, and/or data items may be stored in the FFT Engine Task List 526.

The contents of the FFT Engine Task List 526 can be held in firmware or other memory, and can be updated and modified with new or different instructions, variables, and/or data as, needed.

The instructions, variables, and/or operational data held in the FFT Engine Task List 526 can be requested by the FFT control block 550a and stored in registers of the block 550a, or can be presented to the FFT control block 550a by the instruction processor 520 without a specific request from the block 550a.

After the FFT engine 550 has converted the received and buffered time domain data samples into a block of frequency-domain data, a total of k rows of OFDM data are provided to the filter correction device 560. Each orthogonal frequency component will have a resolved values for its frequency $f_k$ and time t, as represented by the following equation:

$$I+jQ = A\exp(-j2\pi f_k t),$$

where A designates amplitude, I designates in-phase part of the frequency component, and Q designates the quadrature part of the frequency component.

Note that in practical operation, the FFT data may require amplitude and/or phase corrections.

We now proceed to describe the mechanisms for the FFT engine to accommodate a large dynamic range of the received time-domain signals.

Figure 6A:
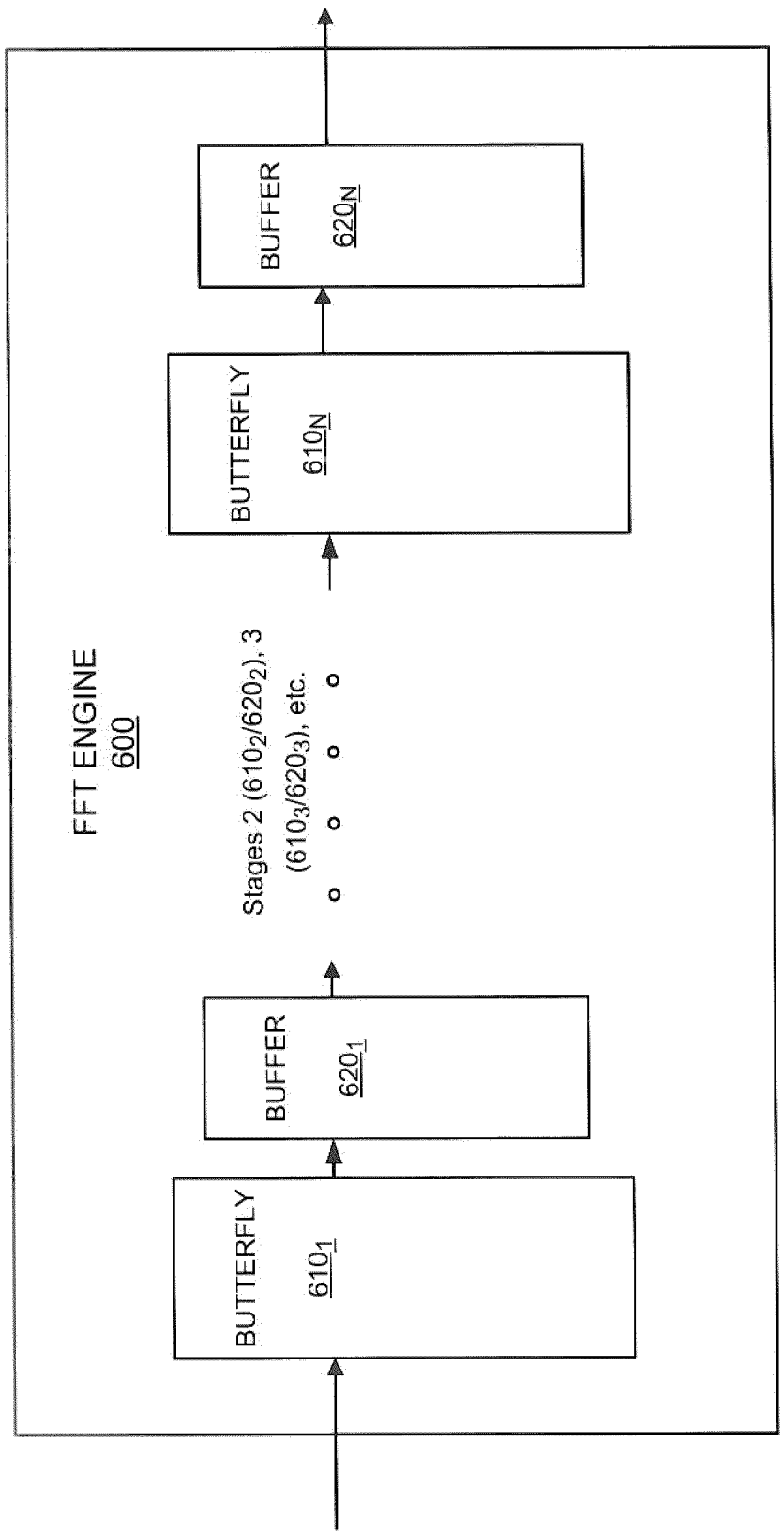
FIG. 6A illustrates selected components of a fast Fourier transform engine.

FIG. 6A illustrates selected elements of an FFT engine 600 (which may be the same as the FFT engine 550). The FFT engine 600 includes a plurality of N internal FFT stages or butterflies $610_n$. (Recall discussion of butterflies above.) Each butterfly 610 is followed by a buffer 620 configured to receive and store the output of the nearest preceding butterfly 610, and to provide the stored data as input to the nearest following butterfly 610. Although FIG. 6A shows only two butterflies 610 and two associated buffers 620, the FFT engine 600 may have a greater or a smaller number of the butterflies 610, with 3-4 being a typical number of butterflies in many designs. For example, the FFT engine 600 may include four, eight, or sixteen butterflies and an equal number of their associated buffers.

Successive butterflies 610 are employed in successive stages of the FFT process. Thus, butterfly $610_1$ is used in the first stage of the FFT engine 600, and its output is stored in the buffer $620_1$. The contents of the buffer $620_1$ are then taken up by the butterfly $610_2$ in the second stage of the FFT engine 600, and its output is stored in the buffer $620_2$. The contents of the buffer $620_2$ are in turn provided to the input of the butterfly $610_3$ in the third stage of the FFT engine 600, and the output of the butterfly $610_3$ is stored in the buffer $620_3$.

The symbols received by the FFT engine 600 across the different FFT sub-channels can have a large dynamic range, because of factors that include frequency domain channel variations, differences in the transmitted power among different sub-channels or tones, and perhaps other factors. Regarding the differences in the transmitted power, beacons in some embodiments may be 30 dB stronger than other sub-channels, and forward link control channel tones may be 0 to 15 dB stronger than other sub-channels. If the FFT engine 600 does not normalize signals, its output can become saturated, leading to distortion of symbols on the saturated and adjacent sub-channels, and consequent poor demodulation performance on such sub-channels. Further, if the FFT engine 600 does not normalize the signals with the large dynamic range, the storage size of the buffers 620 and a buffer (or buffers in case of double buffering) configured to receive the output of the FFT engine 600 may be large relative to analogous buffers in systems configured to process signals having a smaller dynamic range.

Figure 6B:
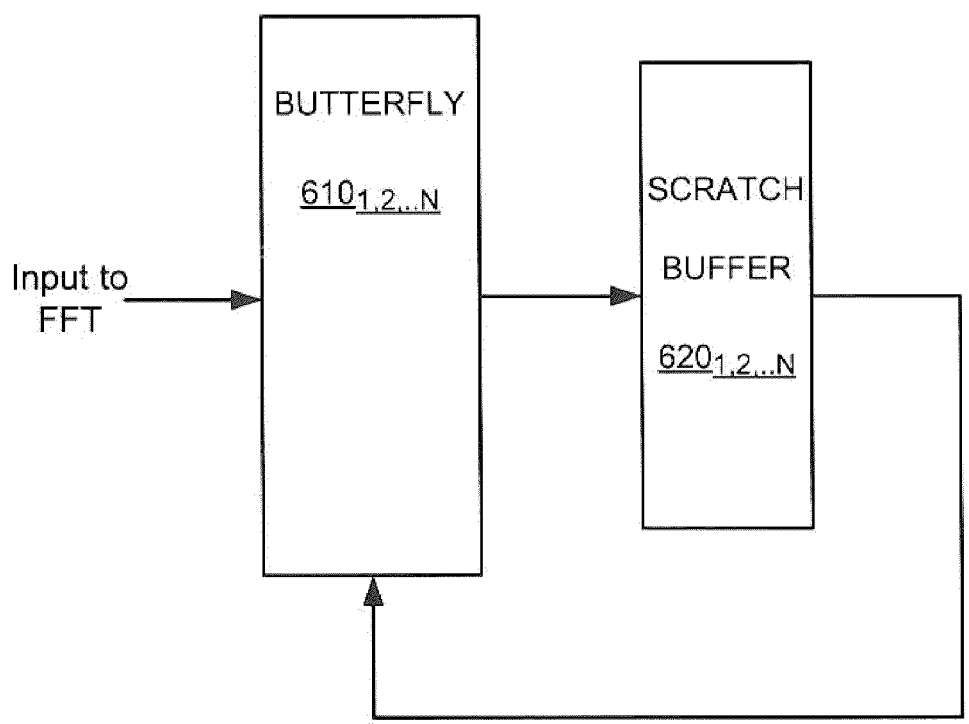
FIG. 6B illustrates selected details of a recursive implementation of the Fourier transform engine of FIG. 6A.

It should be noted that in the FFT engine 600 multiple butterfly-buffer stages may be replaced with one such stage configured to operate successively. This is illustrated in FIG. 6B, which shows a single stage with one butterfly $610_{1,2...N}$ that performs functions of two or more (including all) of the butterflies 610 shown in FIG. 6A, and one buffer $620_{1,2...N}$ that performs functions of two or more (including all) of the buffers 620 shown in FIG. 6A. Here, the stage is configured successively as the first stage (butterfly $610_1$ and buffer $620_1$), then as the second stage (butterfly $610_1$ and buffer $620_1$), and so on, with output of a preceding stage being fed into input of the following stage. We may refer to such configuration as a recursive FFT engine configuration.

Figure 7A:
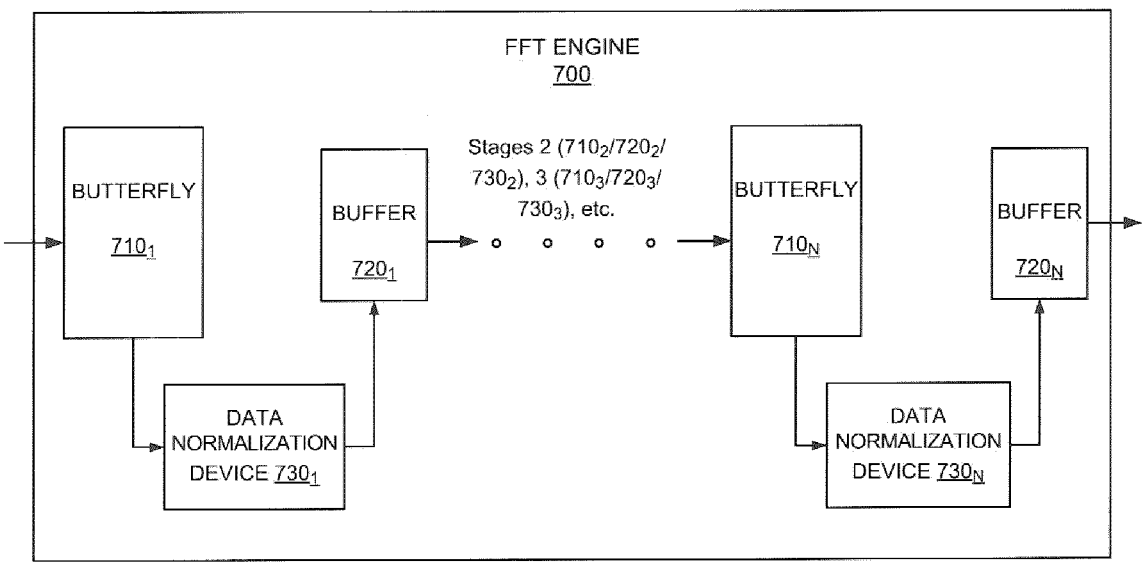
FIG. 7A illustrates selected components of another fast Fourier transform engine with data normalization.

FIG. 7A illustrates another FFT engine implementation, which uses data normalization devices or gain control devices at the outputs of each of the butterflies.

Accordingly, the FFT engine 700 shown in FIG. 7A (which may be the same as the FFT engine 550) has a plurality of N internal FFT stages or butterflies $710_n$. Each butterfly 710 is followed by its associated data normalization or gain control device 730 and a buffer 720. Thus, the stages of the engine 700 are configured in series to process a signal received at the input to the first stage $710_1/720_1/730_1$ successively through the stages and then output from the output of the last stage $710_N/720_N/730_N$. Note that the gain control device $730_n$ interposed between its associated (nearest preceding) butterfly $710_n$ and the buffer $720_n$ associated with that butterfly. The gain control device $730_n$ normalizes (scales to a predetermined amplitude scale/range) the output of its associated butterfly $710_n$, for example by multiplying or dividing the output in the digital domain, and provides the resulting output to the nearest following buffer $720_n$, as shown. The buffer $720_n$ is configured to receive and store the output data of the nearest preceding gain control device $730_n$, and to provide the stored data to the nearest following butterfly $710_{n+1}$. Although FIG. 7A shows only two butterflies 710, two buffers 720, and two gain control devices 730, the FFT engine 700 may have a greater or a smaller number of the butterflies, buffers, and data normalization devices. Some embodiments contain two, three, four, eight, or sixteen butterflies, and equal numbers of their associated buffers and data normalization devices. Moreover, the number of stages may be configurable by the information stored in the FFT Engine Task List 526.

Successive butterflies 710 are employed in successive stages of the FFT process. Thus, the butterfly $710_1$ is used in the first stage of the FFT engine 700, and its output is sent to the gain control device $730_1$ and then (after normalization/scaling) stored in the buffer $720_1$. The contents of the buffer $720_1$ are taken up by the butterfly $710_2$ in the second stage of the FFT engine 700, and its output is provided to the gain control device $730_2$ and stored in the buffer $720_2$, again after appropriate scaling. The contents of the buffer $720_2$ are in turn provided to the input of the butterfly $710_3$ in the third stage of the FFT engine 700, and the output of the butterfly $710_3$ is sent to the gain control device $730_3$ and stored in the buffer $720_3$. And so it continues through the last stage N with its butterfly $710_N$, gain control device $730_N$, and buffer $720_N$.

In operation, the first butterfly stage is executed, for example in the butterfly $710_1$. The output data from the butterfly $710_1$ is normalized by the device $730_1$, e.g. so that all signals within the current data block fall between predetermined maximum and minimum amplitudes of the signal. Next, the normalized data is stored in the buffer $720_1$. The buffered data from the buffer $720_1$ is sent to the next butterfly $710_2$, for the next FFT stage, and the steps are then repeated (with changes in the subscripts) for the following butterflies.

In some embodiments, not every butterfly is followed by a data normalization device. As non-limiting examples, normalization may be accomplished within the FFT engine 700 by way of digital gain control at each stage of FFT engine, or at the input and output of the FFT engine, at one or more intermediate stages, or any combination thereof. In a particular embodiment, normalization is performed following every butterfly except for the last one.

Figure 7B:
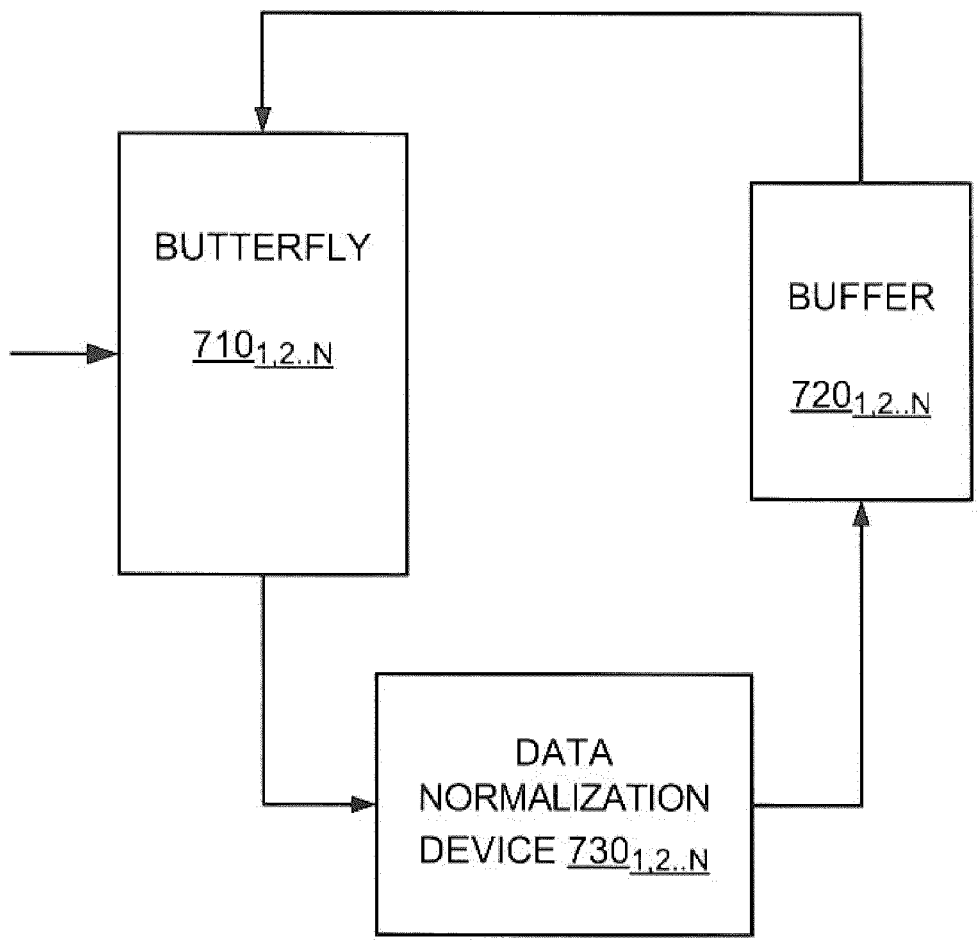
FIG. 7B illustrates selected details of a recursive implementation of the Fourier transform engine of FIG. 7A.

It should be noted that in the FFT engine 700 multiple butterfly-buffer-normalization device stages may be replaced with one such stage configured to operate successively. This is illustrated in FIG. 7B, which shows a single stage with one butterfly $710_{1,2...N}$ that performs functions of two or more (including all) of the butterflies 710 shown in FIG. 7A, one buffer $720_{1,2...N}$ that performs functions of two or more (including all) of the buffers 720 shown in FIG. 6A, and one gain control device $730_{1,2...N}$ that performs functions of two or more (including all) of the gain control devices 730 shown in FIG. 7A. Here, the stage is configured successively as the first stage (butterfly $710_1$, buffer $720_1$, and gain control device $730_1$), then as the second stage (butterfly $710_2$, buffer $720_2$, and gain control device $730_2$), and so on, with output of a preceding stage being fed into input of the following stage. As in the case of the FFT engine 600, we may refer to such configuration as a recursive FFT engine configuration.

The normalization factors of all the data normalization devices are stored, so that the output of the FFT engine 700 can be easily converted to the FFT-transformed data based on the output of the last stage of the FFT engine and the normalization factors (settings of the gain control devices used when the data were processed in the FFT engine), as should be understood by a person of average skill in the art after perusal of this document.

A separate block or module may be responsible for configuring the data normalization devices. Alternatively, the function of controlling and configuring the data normalization devices may be distributed, for example, contained in the data normalization devices themselves. Or the function may be the domain of another processor also configured to perform additional functions.

Because the devices 730 normalize the data operated upon by the butterflies 710, the FFT engine is configured to accommodate a large dynamic range of the input signal with the butterflies 710, the buffers 720, and any other buffers at the output of the FFT engine (such as the buffer used for double buffering) being configured to accommodate a smaller dynamic range of the signal. Normalization thus lowers the FFT bit-width, which can ultimately lead to FFT timeline improvement and FFT area reduction on the chip. The normalization can also lead to a reduction of symbol buffer bit-widths and hence overall modem area reduction. The normalization can provide area and timeline improvements offsetting the cost and increased complexity of including the gain control devices in the FFT engine 700.

In some embodiments, 16-bit signal range at the input to the FFT engine is processed using twelve- or eight-bit wide stages, but different bit-widths of the input and output of the FFT engine also fall within the scope of the invention.

To buffer the FFT data, the output of the FFT engine 700 is stored together with the gain settings of all the gain control devices 730 used for processing the data. Typically, the range of the signal is relatively stable for some duration, such as one, two, three, four, five, and even more OFDM symbols. Consequently, there may not be a need to change the gain settings for the corresponding time duration, and no need to store the gain settings for each set of FFT data during the corresponding time duration. In embodiments, the buffered FFT-processed data is stored together with a pointer to the storage location of the gain settings used in the FFT engine 700 to process the data. In embodiments, the gain settings are updated once per OFDM symbol, once for every two OFDM symbols, once for every three OFDM symbols, once for every four OFDM symbols, or once for every five OFDM symbols. Updating the gain settings for every M symbols for M falling outside the one through five range is also within the scope of the invention, and the number M may be whole or fractional. In embodiments, updating is performed on as-needed basis, that is, one or more of the gain settings are changed (and stored) when the block of signal input into the FFT engine 700 cannot be processed using the current settings without loss of information due to saturation or lack of resolution, given the bit-width of the component butterflies 710 and buffers 720.

In some embodiments, the gain setting of each of the butterflies 710 has two, three, four, or five bits of resolution. Other numbers of bits for setting the gain of the butterflies 710 may be used in some other embodiments.

In some embodiments, the resolution of the gain setting is varied in steps corresponding to factors of 2, for example, 1, 2, 4, 8, 16 (or corresponding fractions or multiples of these numbers). Advantageously, the use of such binary steps in setting the gains allows easy normalization (multiplication and division) of the data through left and right bit shifting operations.

Another technique for reducing buffer and FFT engine sizes is to lower the bit-width of the FFT engine and symbol buffer output (at the output of the FFT engine), and at the same time lower the sample server (which provides the input to the FFT engine) bit width in response to varying quality of the signal. Note that when the received signal is of high quality, the dynamic range in the frequency domain at the output of the FFT engine is generally low for a mobile terminal. This is because the base transceiver station is informed that the mobile station has a high quality signal and consequently the base transceiver station does not significantly vary the forward link power. In high quality scenarios, therefore, the bit width of the FFT engine and/or the symbol buffer can be lowered. In low quality signal scenarios, the dynamic range may be relatively much higher. This is so, for example, because the base transceiver station may transmit some tones with high power in order to connect with the mobile terminal. But the low quality of the received signal means that the bit width of the sample server may be lowered without significant quality loss in the received information, because the resolution at the bottom of the range typically reflects mostly noise and/or interference. Lowered bit width of the sample buffer leads to the lowered need for the FFT engine and symbol buffer bit widths.

Thus, in embodiments, the bit width of the signal fed into the FFT engine is varied as a function of the signal-to-noise ratio (SNR), signal-to-noise-and-interference ratio (SINR), carrier-to-interference (C/I), or another similar metric of the received signal that is processed in the FFT engine. The variation of the input bit width may be performed gradually, continually, or in one or more steps. In a variant, the bit width of the input signal (sample server output) is set to a first predetermined length if the monitored signal quality metric (e.g. SNR, SINR, C/I) is above a predetermined level; the sample server bit width is set to a second predetermined length that is lower than the first predetermined length when the signal quality metric is above the predetermined level. The lowered sample server bit width is achieved by dropping the least significant bits of the sample server.

The sample server back-off technique described in the last two paragraphs may be used together with the above-described normalization technique, or instead of the normalization technique. One embodiment uses an 11-bit sample server and a 14-bit FFT engine and symbol buffer. All of these techniques can lead to a reduction in distortion, and hence performance improvement. Moreover, the last-mentioned technique can accommodate larger sub-channel power boosts in low carrier-to-interference scenarios, without incurring an increase in the FFT and/or symbol buffer bit-widths.

Figure 8:
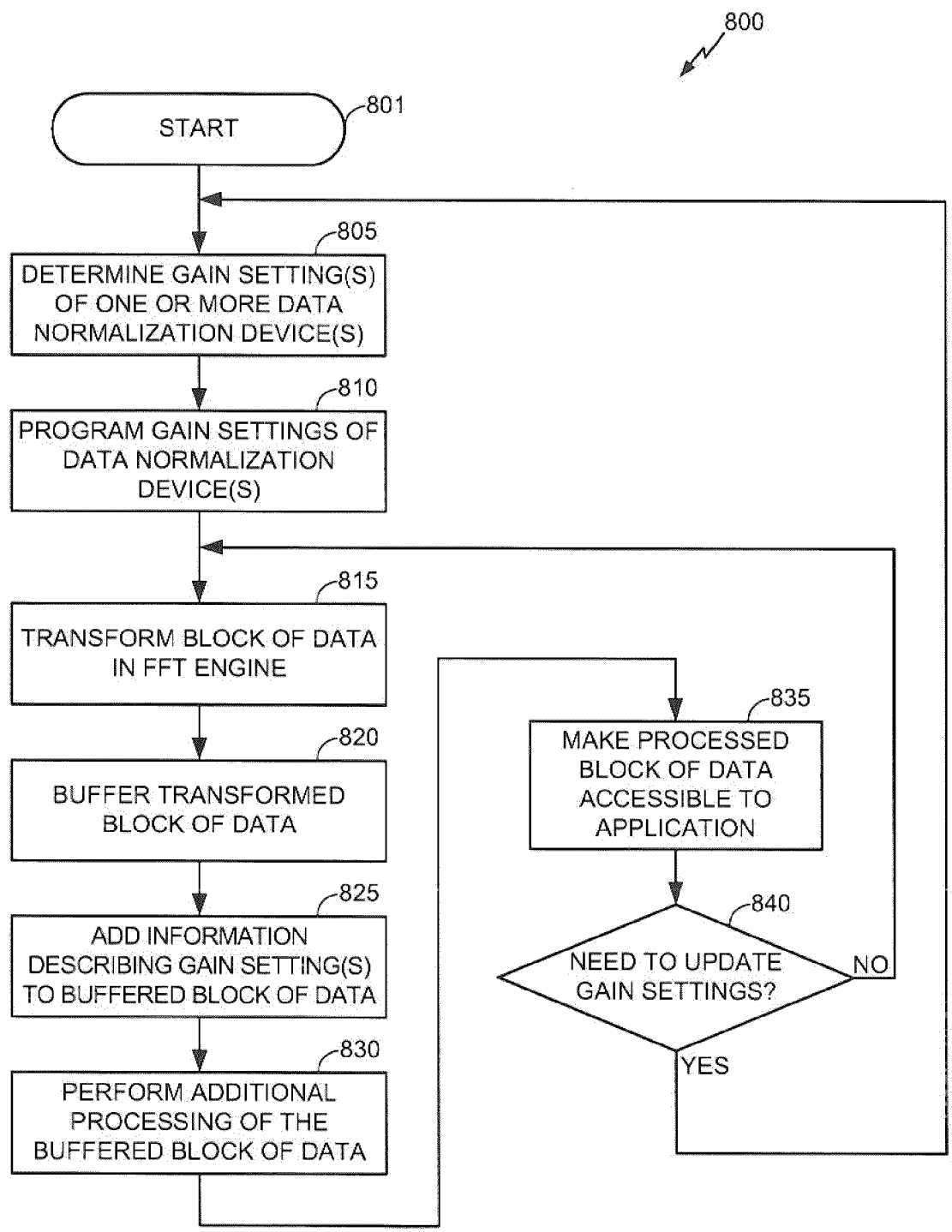
FIG. 8 illustrates selected steps and decisions of a process for operating the fast Fourier transform engine of FIG. 7.

FIG. 8 illustrates selected steps and/or decision blocks of an exemplary process 800 used to operate an FFT engine, such as the FFT engine 700 shown in FIG. 7.

The process flow begins at a flow point 801 and proceeds to step 805, where the data gain settings of one, a plurality, or all of the data normalization devices are determined for the next processing period or data block, such as a data block corresponding to one or several OFDM symbols.

In step 810, the gains of the data normalization devices are set or programmed in accordance with the determination made in the step 805.

In step 815, a block of data (e.g., an OFDM symbol, fraction of an OFDM symbol, or a multiple of OFDM symbol) is processed in the FFT engine using the settings made in the step 810.

In step 820, the block processed in the step 815 is buffered (e.g., single- or double-buffered).

In step 825, information describing the gain settings of the butterflies 830 during the FFT engine processing of the block is also added to the buffered block. For example, the actual coefficients or pointers to the actual coefficients are stored.

In step 830, the buffered block (including the gain settings) is further processed, for example, corrected for realizable filter distortions in amplitude and phase.

In step 835 the block processed in the step 830 is stored or otherwise made accessible to an application, such as an application for decoding and rendering audio and/or video for playing to a user of the wireless device in which the process 800 is performed. The application then accesses the block of data and acts upon it, for example, by rendering the information encoded or otherwise contained in the data. The application may be implemented as a hardware, software, and/or firmware block.

The process flow then proceeds to decision block 840, where a decision is made whether one or more of the gain settings need to be updated. The decision may be based on the amount of data processed with the current gain settings (for example, whether one OFDM symbol or another predetermined number of OFDM symbols have been processed with the current gain settings), or made on as-needed basis (for example, signal amplitude range exceeds predetermined upper limit or falls below a predetermined lower limit).

If the gain settings need not be updated, as determined in the decision block 840, the process flow returns to the step 815 to operate on another (e.g., next) block of data using the current gain settings. Otherwise, the process flow return to the step 805 to determine the new gain settings of the butterflies 710 for processing another (e.g. next) block of data in the FFT engine.

Although steps and decision blocks of various methods may have been described serially in this disclosure, some of these steps and decisions may be performed by separate elements in conjunction or in parallel, asynchronously or synchronously, in a pipelined manner, or otherwise. There is no particular requirement that the steps and decisions be performed in the same order in which this description lists them, except where explicitly so indicated, otherwise made clear from the context, or inherently required. It should be noted, however, that in selected variants the steps and decisions are performed in the particular sequences described above and/or shown in the accompanying Figures. Furthermore, not every illustrated step and decision may be used in every system, while some steps and decisions that have not been specifically illustrated may be desirable in some systems.

It should be noted that, in aspects, the inventive concepts disclosed may be used on forward links, reverse links, peer-to-peer links, and in other non-multiple access contexts. It should also be noted that the communication techniques that are described in this document may be used for unidirectional traffic transmissions, as well as for bidirectional traffic transmissions.

Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments and variants disclosed herein may be implemented as electronic hardware, computer software, or combinations of both. To show clearly this interchangeability of hardware and software, various illustrative components, blocks, modules, circuits, and steps may have been described above generally in terms of their functionality. Whether such functionality is implemented as hardware, software, or combination of hardware and software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments and variants disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g. a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media include both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, flash memory, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and blu-ray disc where "disks" usually reproduce data magnetically, while "discs" reproduce data optically with lasers and LEDs. Combinations of the above should also be included within the scope of computer-readable media.

The previous description of the disclosed embodiments and variants is provided to enable any person skilled in the art to make or use the present invention. Various modifications to these embodiments will be readily apparent to those skilled in the art, and the generic principles defined herein may be applied to other embodiments. Thus, the present invention is not intended to be limited to the embodiments and variants shown herein, but is to be accorded the widest scope consistent with the principles and novel features disclosed herein.

What is claimed is:

1. A wireless communication method comprising steps of:
    transforming a block of received signal data in a plurality of stages arranged in series so that the block of received signal data is inputted into a first stage of the plurality of stages, processed successively through each stage of the plurality of stages, and a fast Fourier transformed block of signal data is outputted from a last stage of the plurality of stages, each stage of the plurality of stages comprising a butterfly and a data normalization device wherein the data normalization device of said each stage scales to a predetermined range output of the butterfly of said each stage by a normalization factor corresponding to the data normalization device of said each stage;
    for said each stage, adjusting the normalization factor corresponding to the data normalization device of said each stage, wherein the step of adjusting comprises determining, for said each stage, the normalization factor corresponding to the data normalization device of said each stage, wherein the step of adjusting is performed for each block of received signal data, said each block being of predetermined size;
    processing the fast Fourier transformed block to obtained a processed block of data; and
    using the processed block in an application of a wireless device, wherein the step of using the processed block comprises rendering information contained in the processed block.

2. The wireless communication method of claim 1, wherein the step of adjusting is performed on as-needed basis.

3. The wireless communication method of claim 1, wherein the step of adjusting is performed in binary steps.

4. The wireless communication method of claim 1, further comprising storing the fast Fourier transformed block before the step of processing.

5. The wireless communication method of claim 4, wherein the step of storing comprises adding data describing said each normalization factor to the fast Fourier transformed block before the step of processing.

6. The wireless communication method of claim 4, wherein the step of storing comprises, for said each stage, adding a pointer to memory storing said each normalization factor to the fast Fourier transformed block before the step of processing.

7. The wireless communication method of claim 1, wherein the step of processing comprises decoding the information, and the step of decoding is performed before the step of rendering.

8. The wireless communication method of claim 1, wherein the information contained in the processed block comprises at least one of audio information and video information, and the step of rendering comprises rendering the at least one of audio information and video information.

9. The wireless communication method of claim 8, further comprising wirelessly receiving the block of received signal data in at least one orthogonal frequency division multiplexing (OFDM) symbol.

10. The wireless communication method of claim 1, wherein said each stage further comprises a stage buffer.

11. The wireless communication method of claim 1, further comprising double buffering the fast Fourier transformed block before the step of using.

12. A wireless communication method comprising steps of:
transforming a block of received signal data in a plurality of stages arranged in series so that the block of received signal data is inputted into a first stage of the plurality of stages, processed successively through each stage of the plurality of stages, and a fast Fourier transformed block of signal data is outputted from a last stage of the plurality of stages, each stage of the plurality of stages comprising a butterfly and a data normalization device wherein the data normalization device of said each stage scales to a predetermined range output of the butterfly of said each stage by a normalization factor corresponding to the data normalization device of said each stage, wherein the received signal data is obtained from a received signal;
monitoring a quality indication of the received signal;
varying bit width of the received signal data in response to the quality indication, wherein the bit width of the received signal data is lowered in response to the lowered quality of the received signal;
for said each stage, adjusting the normalization factor corresponding to the data normalization device of said each stage;
processing the fast Fourier transformed block to obtained a processed block of data; and
using the processed block in an application of a wireless device, wherein the step of using the processed block comprises rendering information contained in the processed block.

13. The wireless communication method of claim 1, wherein the plurality of stages is implemented as a single hardware stage in a recursive FFT engine configuration.

14. A device comprising:
a fast Fourier transform (FFT) block comprising an input, an output, and a plurality of stages arranged in series so that the FFT block is configured to process a block of received signal data inputted into a first stage of the plurality of stages successively through each stage of the plurality of stages to obtain a fast Fourier transformed block of signal data and to output the fast Fourier transformed block from the output of the FFT block, each stage of the plurality of stages comprising a butterfly and a data normalization device wherein the data normalization device of said each stage scales to a predetermined range output of the butterfly of said each stage by a normalization factor corresponding to the data normalization device of said each stage;
a normalization control block configured, for said each stage, to adjust the normalization factor corresponding to the data normalization device of said each stage, wherein the normalization control block is configured to determine the normalization factor corresponding to the data normalization device of said each stage, wherein the normalization control block is configured to adjust the normalization factors for each block of received signal data, said each block being of predetermined size;
a processing block configured to process the fast Fourier transformed block to obtain a processed block of data; and
an application block configured to operate on the processed block of data, wherein the application block is configured to render information contained in the processed block.

15. The device of claim 14, wherein the normalization control block is configured to adjust the normalization factors on as-needed basis.

16. The device of claim 14, wherein the normalization control block is configured to adjust the normalization factors in binary steps.

17. The device of claim 14, further comprising a buffer configured to store the fast Fourier transformed block before the fast Fourier transformed block is processed by the processing block.

18. The device of claim 17, wherein the buffer is configured to store data describing said each normalization factor with the fast Fourier transformed block.

19. The device of claim 17, wherein the buffer is configured to store a pointer to memory storing said each normalization factor with the fast Fourier transformed block.

20. The device of claim 14, wherein the processing block comprises a decoder configured to decode the information.

21. The device of claim 14, wherein the information contained in the processed block comprises at least one of audio information and video information, and the application block is configured to render the at least one of audio information and video information.

22. The device of claim 21, further comprising a wireless receiver configured to receive the block of received signal data in at least one orthogonal frequency division multiplexing (OFDM) symbol.

23. The device of claim 14, wherein said each stage further comprises a stage buffer.

24. The device of claim 14, further comprising a double buffer configured to double buffer the fast Fourier transformed block.

25. A device comprising:
a fast Fourier transform (FFT) block comprising an input, an output, and a plurality of stages arranged in series so that the FFT block is configured to process a block of received signal data inputted into a first stage of the plurality of stages successively through each stage of the plurality of stages to obtain a fast Fourier transformed block of signal data and to output the fast Fourier transformed block from the output of the FFT block, each stage of the plurality of stages comprising a butterfly and a data normalization device wherein the data normalization device of said each stage scales to a predetermined range output of the butterfly of said each stage by a normalization factor corresponding to the data normalization device of said each stage, wherein the received signal data is obtained from a received signal;

a sample server coupled to the input of the FFT block, the sample server being configured to vary bit width of the received signal data in response to a quality indication of the received signal, wherein the bit width of the received signal data is lowered in response to lowered quality of the received signal;

a processing block configured to process the fast Fourier transformed block to obtain a processed block of data; and an application block configured to operate on the processed block of data, wherein the application block is configured to render information contained in the processed block.

26. The device of claim 14, wherein the plurality of stages is implemented as a single hardware stage in a recursive FFT engine configuration.

27. A wireless device comprising:

at least one receiver;

at least one transmitter; and at least one controller coupled to the at least one receiver and the at least one transmitter, wherein the at least one controller is configured to perform steps comprising:

transforming a block of received signal data in a plurality of stages arranged in series so that the block of received signal data is inputted into a first stage of the plurality of stages, processed successively through each stage of the plurality of stages, and a fast Fourier transformed block of signal data is outputted from a last stage of the plurality of stages, each stage of the plurality of stages comprising a butterfly and a data normalization device wherein the data normalization device of said each stage scales to a predetermined range output of the butterfly of said each stage by a normalization factor corresponding to the data normalization device of said each stage;

for said each stage, adjusting the normalization factor corresponding to the data normalization device of said each stage, wherein the step of adjusting comprises determining, for said each stage, the normalization factor corresponding to the data normalization device of said each stage, wherein the step of adjusting is performed for each block of received signal data, said each block being of predetermined size;

processing the fast Fourier transformed block to obtained a processed block of data; and using the processed block in an application of the wireless device, wherein the step of using the processed block comprises rendering information contained in the processed block.

28. A computer program product, comprising:

non-transitory computer-readable medium comprising:

code for causing a computer to communicate wirelessly, comprising:

transforming a block of received signal data in a plurality of stages arranged in series so that the block of received signal data is inputted into a first stage of the plurality of stages, processed successively through each stage of the plurality of stages, and a fast Fourier transformed block of signal data is outputted from a last stage of the plurality of stages, each stage of the plurality of stages comprising a butterfly and a data normalization device wherein the data normalization device of said each stage scales to a predetermined range output of the butterfly of said each stage by a normalization factor corresponding to the data normalization device of said each stage;

for said each stage, adjusting the normalization factor corresponding to the data normalization device of said each stage, wherein the step of adjusting comprises determining, for said each stage, the normalization factor corresponding to the data normalization device of said each stage, wherein the step of adjusting is performed for each block of received signal data, said each block being of predetermined size;

processing the fast Fourier transformed block to obtained a processed block of data; and using the processed block in an application of a wireless device, wherein the step of using the processed block comprises rendering information contained in the processed block.

29. A device comprising:

means for transforming a block of received signal data in a plurality of stages arranged in series so that the block of received signal data is inputted into a first stage of the plurality of stages, processed successively through each stage of the plurality of stages, and a fast Fourier transformed block of signal data is outputted from a last stage of the plurality of stages, each stage of the plurality of stages comprising a butterfly and a data normalization device wherein the data normalization device of said each stage scales to a predetermined range output of the butterfly of said each stage by a normalization factor corresponding to the data normalization device of said each stage;

means for adjusting, for said each stage, the normalization factor corresponding to the data normalization device of said each stage, wherein the step of adjusting comprises determining, for said each stage, the normalization factor corresponding to the data normalization device of said each stage, wherein the step of adjusting is performed for each block of received signal data, said each block being of predetermined size;

means for processing the fast Fourier transformed block to obtain a processed block of data; and means for rendering information contained in the processed block of data.

30. A wireless device comprising:

at least one receiver;

at least one transmitter; and at least one controller coupled to the at least one receiver and the at least one transmitter, wherein the at least one controller is configured to perform steps comprising:

transforming a block of received signal data in a plurality of stages arranged in series so that the block of received signal data is inputted into a first stage of the plurality of stages, processed successively through each stage of the plurality of stages, and a fast Fourier transformed block of signal data is outputted from a last stage of the plurality of stages, each stage of the plurality of stages comprising a butterfly and a data normalization device wherein the data normalization device of said each stage scales to a predetermined range output of the butterfly of said each stage by a normalization factor corresponding to the data normalization device of said each stage, wherein the received signal data is obtained from a received signal;

monitoring a quality indication of the received signal;

varying bit width of the received signal data in response to the quality indication, wherein the bit width of the received signal data is lowered in response to the lowered quality of the received signal;

for said each stage, adjusting the normalization factor corresponding to the data normalization device of said each stage;

processing the fast Fourier transformed block to obtained a processed block of data; and using the processed block in an application of the wireless device, wherein the step of using the processed block comprises rendering information contained in the processed block.

31. A computer program product, comprising:
non-transitory computer-readable medium comprising:
code for causing a computer to communicate wirelessly, comprising:
transforming a block of received signal data in a plurality of stages arranged in series so that the block of received signal data is inputted into a first stage of the plurality of stages, processed successively through each stage of the plurality of stages, and a fast Fourier transformed block of signal data is outputted from a last stage of the plurality of stages, each stage of the plurality of stages comprising a butterfly and a data normalization device wherein the data normalization device of said each stage scales to a predetermined range output of the butterfly of said each stage by a normalization factor corresponding to the data normalization device of said each stage, wherein the received signal data is obtained from a received signal;
monitoring a quality indication of the received signal;
varying bit width of the received signal data in response to the quality indication, wherein the bit width of the received signal data is lowered in response to the lowered quality of the received signal;
for said each stage, adjusting the normalization factor corresponding to the data normalization device of said each stage;
processing the fast Fourier transformed block to obtained a processed block of data; and
using the processed block in an application of a wireless device, wherein the step of using the processed block comprises rendering information contained in the processed block.

32. A device comprising:
means for transforming a block of received signal data in a plurality of stages arranged in series so that the block of received signal data is inputted into a first stage of the plurality of stages, processed successively through each stage of the plurality of stages, and a fast Fourier transformed block of signal data is outputted from a last stage of the plurality of stages, each stage of the plurality of stages comprising a butterfly and a data normalization device wherein the data normalization device of said each stage scales to a predetermined range output of the butterfly of said each stage by a normalization factor corresponding to the data normalization device of said each stage, wherein the received signal data is obtained from a received signal;
means for monitoring a quality indication of the received signal;
means for varying bit width of the received signal data in response to the quality indication, wherein the bit width of the received signal data is lowered in response to the lowered quality of the received signal;
means for adjusting, for said each stage, the normalization factor corresponding to the data normalization device of said each stage;
means for processing the fast Fourier transformed block to obtain a processed block of data; and
means for rendering information contained in the processed block of data.

* * * * *